US012004554B2

(12) United States Patent
Liuzza

(10) Patent No.: US 12,004,554 B2
(45) Date of Patent: Jun. 11, 2024

(54) MULTI-USE TOOL

(71) Applicant: Victor Liuzza, Fleming Island, FL (US)

(72) Inventor: Victor Liuzza, Fleming Island, FL (US)

( * ) Notice: Subject to any disclaimer, the term of this patent is extended or adjusted under 35 U.S.C. 154(b) by 468 days.

(21) Appl. No.: 17/332,505

(22) Filed: May 27, 2021

(65) Prior Publication Data

US 2021/0368849 A1 Dec. 2, 2021

Related U.S. Application Data

(60) Provisional application No. 63/030,783, filed on May 27, 2020.

(51) Int. Cl.
*A24B 7/00* (2006.01)
*A24F 9/02* (2006.01)
*A24F 9/04* (2006.01)
*B26B 11/00* (2006.01)

(52) U.S. Cl.
CPC .................. *A24B 7/00* (2013.01); *A24F 9/02* (2013.01); *A24F 9/04* (2013.01); *B26B 11/00* (2013.01)

(58) Field of Classification Search
CPC ..... A24B 7/00; A24F 9/02; A24F 9/04; B26B 11/00
USPC .............................................................. 7/158
See application file for complete search history.

(56) References Cited

U.S. PATENT DOCUMENTS

| | | | | | |
|---|---|---|---|---|---|
| 45,258 | A | * | 11/1864 | Matile | A24F 9/02 131/245 |
| 1,207,375 | A | * | 12/1916 | Cramer | A24F 9/02 131/246 |
| 1,411,965 | A | * | 4/1922 | Ganster | A24F 9/10 408/199 |
| 2,087,742 | A | * | 7/1937 | Slepian | A24F 9/10 131/331 |
| 4,444,211 | A | * | 4/1984 | MacDonald | A24F 9/10 131/246 |
| 8,713,735 | B1 | | 5/2014 | Pelton | |
| 9,302,383 | B2 | | 4/2016 | Barr | |
| 10,182,596 | B2 | | 1/2019 | Bagwell | |

* cited by examiner

*Primary Examiner* — Hadi Shakeri
(74) *Attorney, Agent, or Firm* — Lippes Mathias LLP; Mitchell Ghaneie; Josephine Chen

(57) ABSTRACT

This unique and novel exemplary embodiment of an invention relates to a multi-use tool used for handling and preparing a variety of herbal products for smoking or consumption. The multi-use tool comprises a substantially compact, flat profile that allows the multi-use tool to be conveniently stored and readily accessible when needed. The multi-use tool provides a combination of tools specially designed for preparing and handling herbal products.

13 Claims, 7 Drawing Sheets

MULTI-USE TOOL

CROSS-REFERENCE TO RELATED APPLICATIONS

This application claims priority of U.S. patent application Ser. No. 63,030,783, filed on May 27, 2020.

BACKGROUND OF THE INVENTION

A. Field of the Invention

This invention relates to a multi-use tool used for handling and preparing a variety of herbal products for their consumption.

B. Prior Art

The prior art teaches of numerous portable general-purpose utility tools. Previously disclosed utility tools are often heavy and bulky such that they are not easily stored and readily accessible when needed. The bulky and heavy designs of utility tools previously disclosed are often comprised of a plurality of separate parts attached to one another such that they are able to move relative to one another. As a result, many of the utility tools previously disclosed require the user to attach the tool externally to an article of clothing. The inconvenience of having to externally attach the utility tool is not insignificant and often dissuades the user from carrying the utility tool in certain settings and situations. Moreover, the constructed are not well-suited for handling and preparing herbal products for consumption.

BRIEF SUMMARY OF THE INVENTION

An exemplary embodiment of the present invention provides a multi-use tool designed for handling and preparing herbal products for consumption. Such herbal products may include, but are not limited to, tobacco, hemp, or medical marijuana. The multi-use tool comprises a slim profile that provides a substantially flat profile. Moreover, the multi-use tool provides a compact configuration that allows for convenient storage when not in use.

The multi-use tool provides a plurality of integrally formed tools designed to assist with performing a variety of tasks associated with preparing and handling herbal products for smoking or consumption. The plurality of integrally formed tools includes a skirt, a first arm, a second arm, and a sweep. It is preferable that the multi-use tool is formed from a rigid material that allows the tool to withstand various stresses induced during use without undergoing significant or unintended deformation.

The skirt extends radially from a central vertex and provides a curved blade that allows the user to chop and mince herbal products, as well as a variety of other agricultural products, into smaller pieces. The curvature along the curved blade is well-suited to promote the rocking action often used when mincing.

The first arm extends laterally from the first side of the multi-use tool and provides a poker. The poker extends from the first arm and is of a reduced width relative to the first arm. The poker is used for cleaning, picking, and packing various smoking related items, such as a smoking pipe or a smoking filtration device. The length of the poker is approximately equal to the length of the first arm. However, it is anticipated that the length of the poker may vary.

Opposite the first arm, the second arm extends from the second side of the multi-use tool and provides a blade along at least one edge of the second arm. The blade allows the user to conveniently cut or trim a variety of materials.

The sweep extends in the opposite direction of the skirt. The sweep provides a uniform thickness that further provides a blunt top surface. The blunt top surface allows the user to pulverize a variety of materials and reposition said material(s) into a pile as needed. The sweep additionally, provides a surface for holding and controlling the multi-use tool.

REFERENCE NUMBERS

- 1—Multi-use tool
- 2—First side
- 2*a*—Upper first side
- 2*b*—Lower first side
- 3—Second side
- 3*a*—Upper second side
- 3*b*—Lower second side
- 4—Top side
- 5—Bottom side
- 6—Front surface
- 7—Rear surface
- 10—Skirt
- 11—Curved blade
- 15—First arm
- 16—Poker
- 20—Second arm
- 21—Blade
- 25—Sweep

DETAILED DESCRIPTION OF THE EMBODIMENTS

An exemplary embodiment of the present invention provides a multi-use tool 1 designed for handling and preparing herbal products for consumption. Herbal products, which may include, but are not limited to, tobacco, hemp, or medical marijuana, are commercially available in a variety of mediums that often require additional manipulation prior to consumption. Consumption of such herbal products may include inhalation, ingestion, or transdermal administration.

The multi-use tool 1 comprises a plurality of tools cleverly designed to assist a user with a variety of tasks commonly encountered when preparing herbal products for consumption.

Figure 1:
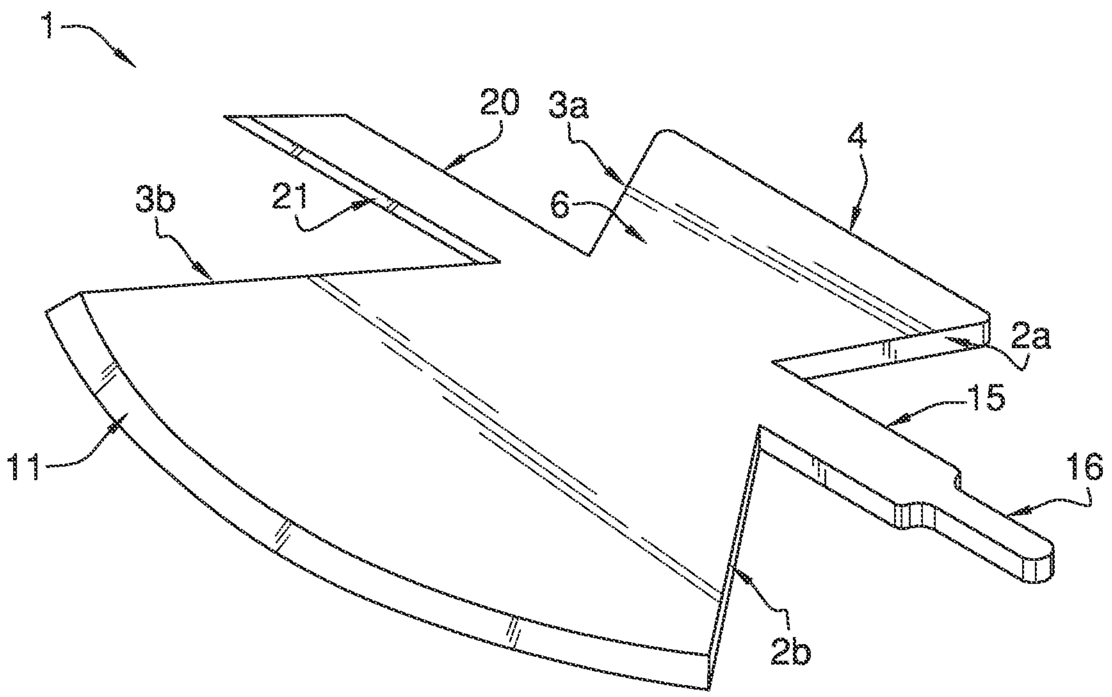
FIG. 1 is an isometric view of a first embodiment of a multi-use tool.

The multi-use tool 1 has a compact and substantially flat profile that allows for convenient storage when not in use. The multi-use tool 1 comprises a thin thickness, relative to its other dimensions, which separates the front surface 6 and rear surface 7, as shown in FIG. 1. The front surface 6 and rear surface 7 are substantially flat and parallel to each other. The multi-use tool 1 provides a first side 2, a second side 3, a top side 4, and a bottom side 5. The first side 2 is comprised of an upper first side 2*a* and a lower first side 2*b*. The second side 3 is comprised of an upper second side 3*a* and a lower second side 3*b*.

The plurality of tools comprises a skirt 10, a first arm 15, a second arm 20, and a sweep 25. The multi-use tool 1 is preferably formed of a rigid material that prevents the multi-use tool 1 from undergoing inelastic deformation during use. However, it is anticipated that the multi-use tool 1 could alternatively be formed of a flexible material that allows the multi-use tool 1 to flex during use. Moreover, it is preferable that the plurality of tools be integrally formed with one another. However, it is also anticipated that the plurality of tools may be unitarily constructed to one another.

Figure 2:
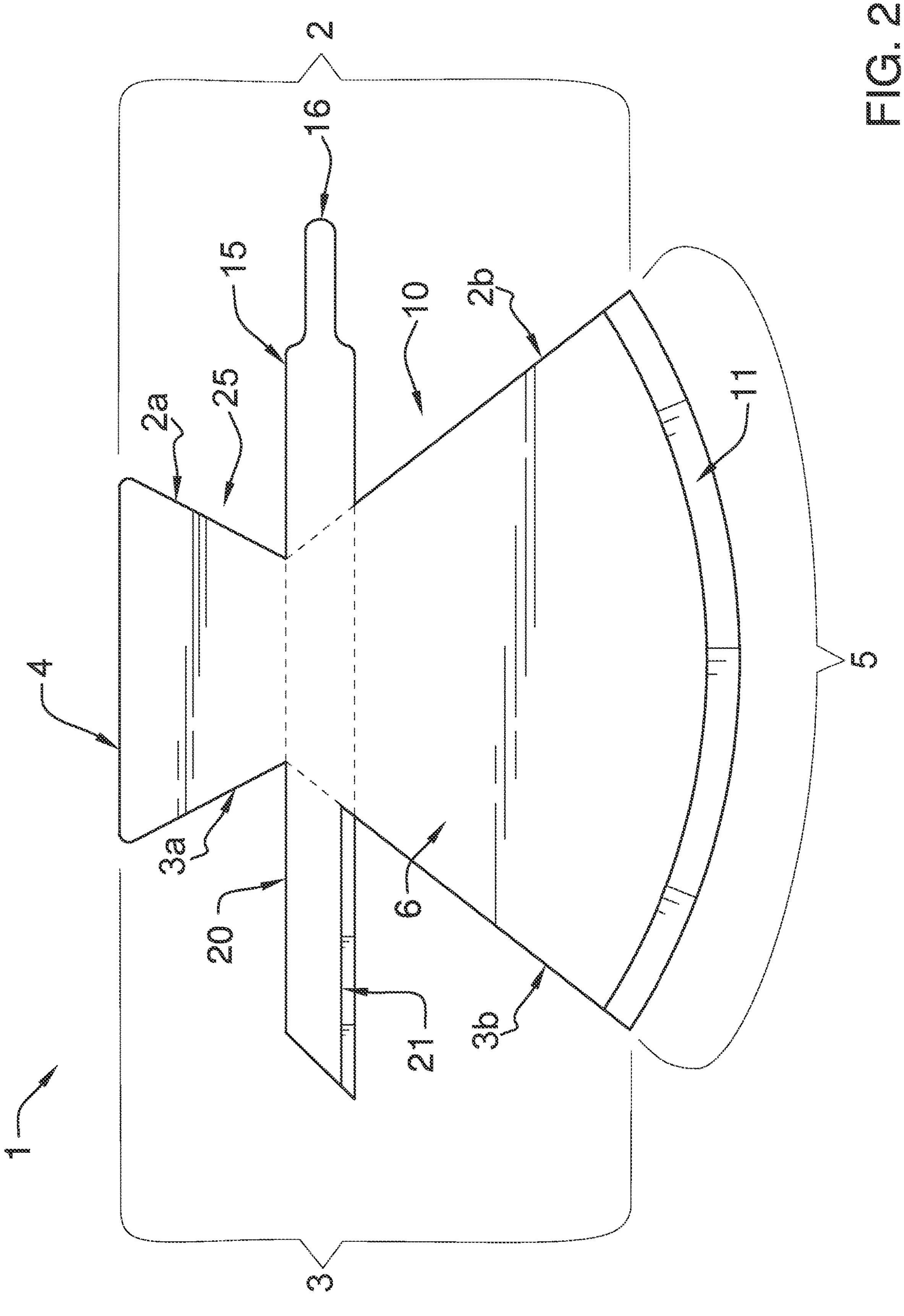
FIG. 2 is a front view of the first embodiment of the multi-use tool.
Figure 3:
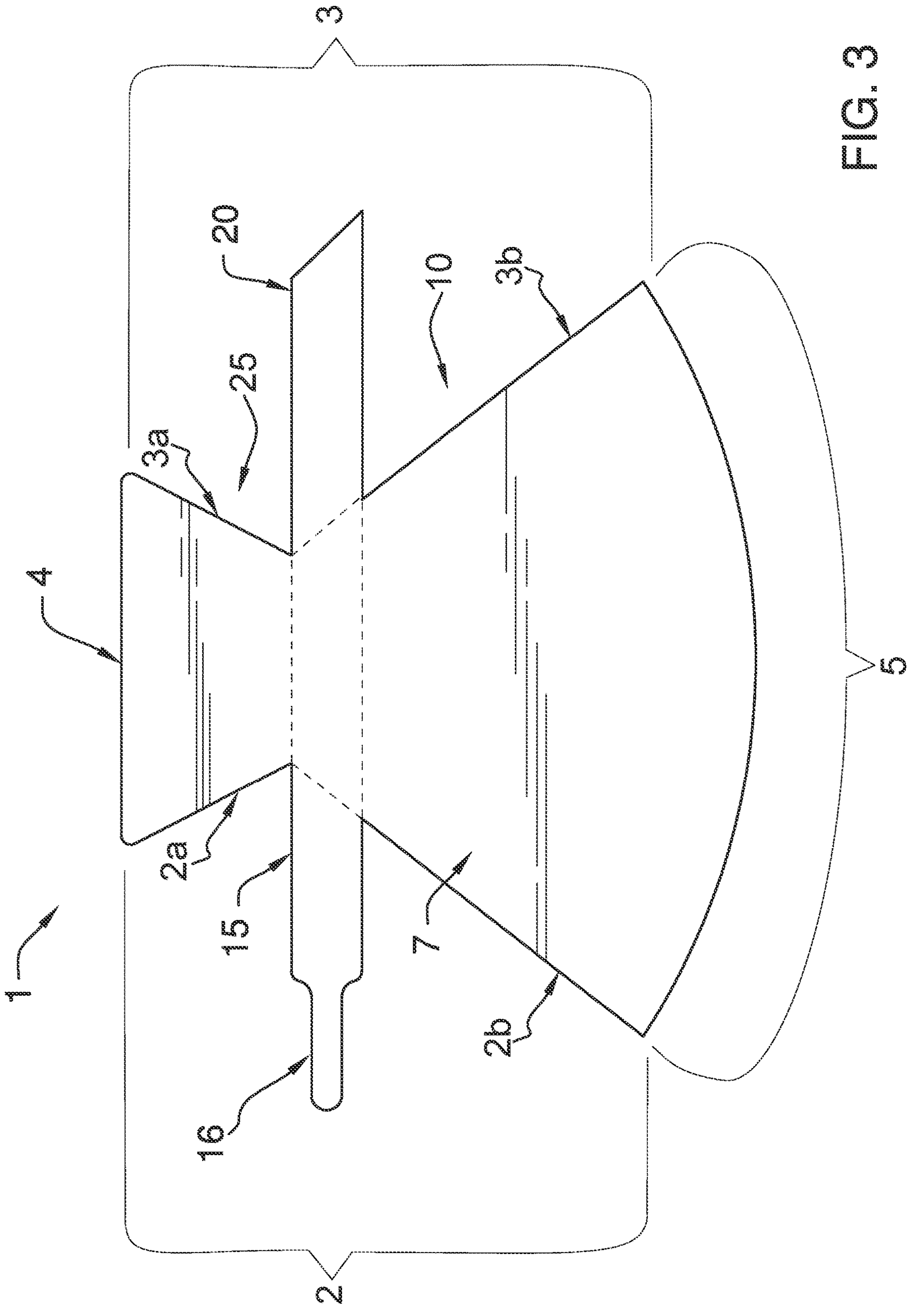
FIG. 3 is a rear view of the first embodiment of the multi-use tool.
Figure 5:
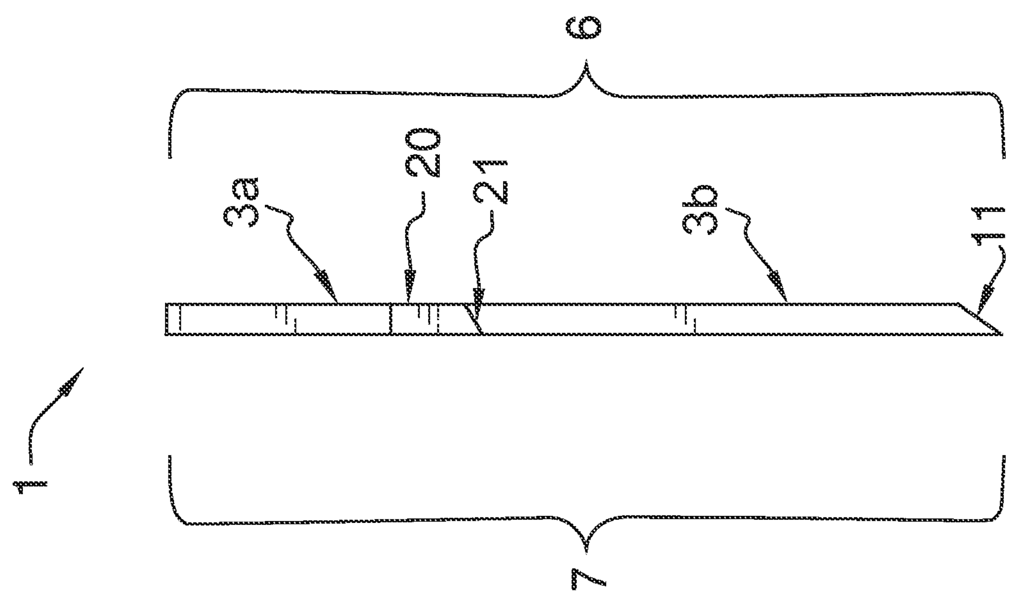
FIG. 5 is a second side view of the first embodiment of the multi-use tool.
Figure 4:
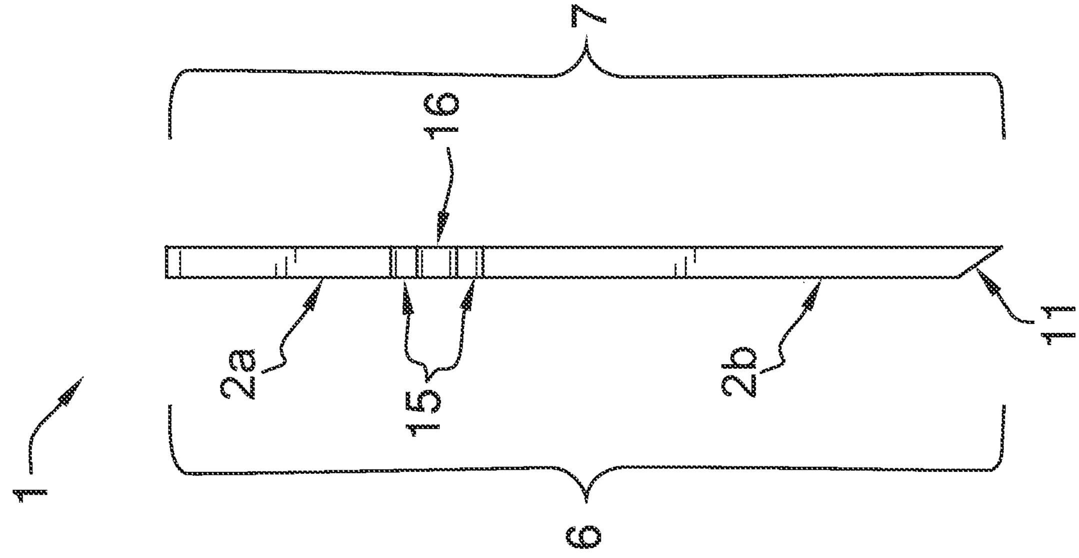
FIG. 4 is a first side view of the first embodiment of the multi-use tool.
Figure 6:
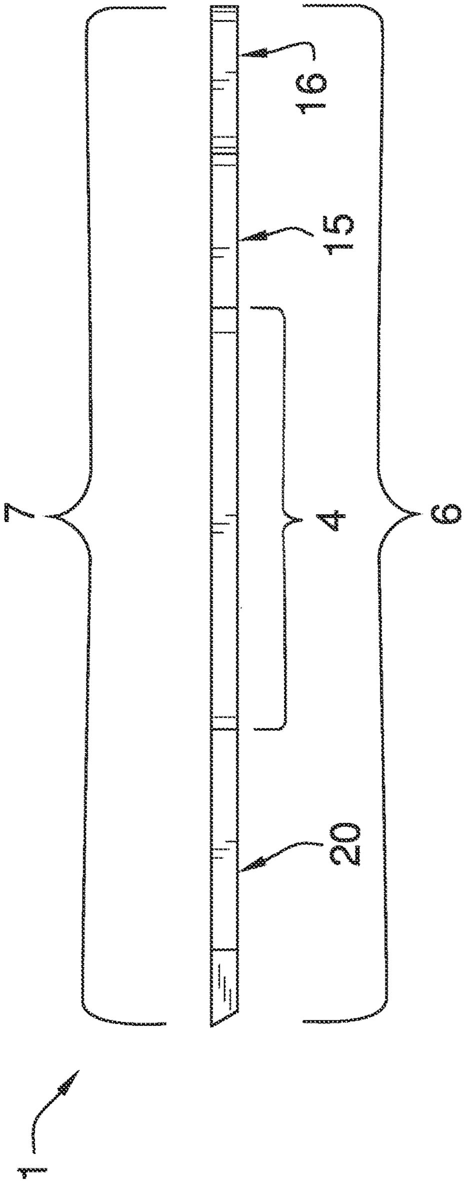
FIG. 6 is a top view of the first embodiment of the multi-use tool.
Figure 7:
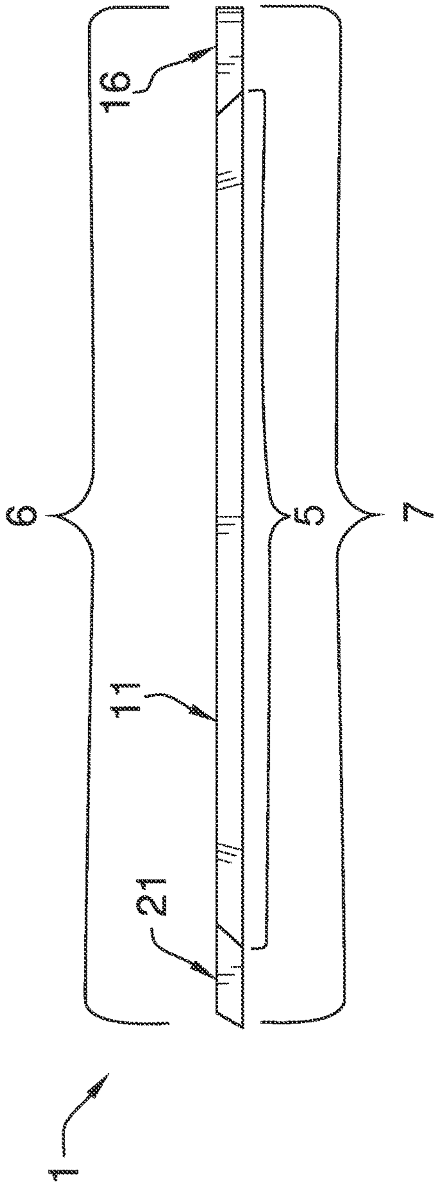
FIG. 7 is a bottom view of the first embodiment of the multi-use tool.

The skirt 10 has a circular sector shape, as shown in FIGS. 1, 2, and 3, and comprises a plurality of sides. The plurality of sides comprising the lower first side 2*b*, the lower second side 3*b*, and the bottom side 5. The lower first side 2*b* and lower second side 3*b* each extend radially from a central vertex. The lower first side 2*b* spans from the first arm 15 to the bottom side 5. The lower second side 3*b* spans from the second arm 20 to the bottom side 5. The bottom side 5 provides a curved blade 11. The curved blade 11 comprises a slanted surface that extends between the front surface 6 and the rear surface 7. The curved blade 11 provides a top edge and a bottom edge. The top edge and bottom edge are integrally connected to the front surface 6 and rear surface 7, respectfully. The top edge and bottom edge each span circumferentially, relative to the central vertex, from the lower first side 2*b* to the lower second side 3*b*, as shown in FIGS. 1, 2, and 3. The radius of curvature of the top edge is not equal to the radius of curvature of the bottom edge. It is preferable that the radius of curvature of the top edge is larger than to the radius of curvature of the bottom edge such that the slanted surface of the curved blade 11 adjoins the rear surface 7 at a significantly acute angle.

The curved blade 11 can be used to chop or mince a variety of materials. It is often desirable to reduce the size of herbal products prior to consuming or smoking them. The curved blade 11 offers a convenient tool for partitioning a variety of materials into smaller pieces. Moreover, the low profile of the curved blade 11 enables the user of the multi-use tool 1 to easily scoop material after mincing.

The first arm 15 extends laterally from the first side 2 of the multi-use tool 1. The first arm 15 has a uniform thickness which is substantially equal to the thickness of the multi-use tool 1. The first arm 15 provides an interior end and an exterior end. The interior end of the first arm 15 is integrally connected to the first side 2. The exterior end of the first arm 15 provides a poker 16, which cantilevers out from the exterior end of the first arm 15, as shown in FIGS. 1, 2, and 3. The poker 16 has a reduced width relative to the first arm 15. The first arm 15 spans between the interior end of the first arm 15 and the exterior end of the first arm 15. While the length of the first arm 15 is shown within FIGS. 2 and 3 to be greater than the length of the poker 16, it is anticipated that the length of the poker 16 may be greater than the length of the first arm 15.

The poker 16 is designed to be used for cleaning, picking, and packing various smoking related items, such as a smoking pipe or a filtration device. It is anticipated that the profile of the end of the poker 16 may be of varying geometry. For example, the end of the poker 16 may take the form of a sharp point, a smoothly curved surface, or a polyhedron. It is further anticipated that the poker 16 may alternatively be shaped and utilized as a pestle for grinding or crushing a variety of materials, which may include herbal products.

The second arm 20 extends laterally from the second side 3 of the multi-use tool 1. The second arm 20 has a uniform thickness and is substantially equal to the thickness of the multi-use tool 1. In the exemplary embodiment the multi-use tool 1 the length of the second arm 20 is substantially equal to the combined length of the first arm 15 and poker 16, as shown in FIGS. 2 and 3. However, it is anticipated that the length of the second arm 20 may vary relative to the combined length of the first arm 15 and poker 16.

The second arm 20 provides a blade 21. The blade 21 comprises a slanted surface that connects the front surface 6 with the rear surface 7. In the exemplary embodiment the multi-use tool 1 the slanted surface of the blade 21 adjoins the rear surface 7 at a significantly acute angle. Alternatively, it is anticipated that the slanted surface of the blade 21 could adjoin the front surface 6 at a significantly acute angle.

The blade 21 allows the user of the multi-use tool 1 to cut or trim a variety of materials as desired. Rolling paper and tobacco leaves are often used to wrap and encase herbal products prior to smoking them. In some instances, the size and shape of the rolling paper or tobacco leaf may need to be altered to accommodate the quantity of herbal product intended to be smoked. The blade 21 of the second arm 20 assists the user in conveniently cutting as well as modifying the size and shape of the rolling paper or tobacco leaf.

The sweep 25 comprises an inverted trapezoidal shape with rounded corners, as shown in FIG. 1. The sweep 25 extends in the opposite direction of the skirt 10, as shown in FIGS. 2 and 3. The thickness of the sweep 25 is substantially uniform. The sweep 25 comprises three sides which include the top side 4, the upper first side 2*a*, and upper second side 3*a*. The top side 4 provides a substantially flat, blunt surface. The top side 4 spans between the upper first side 2*a* and the upper second side 3*a* of the multi-use tool 1, as shown in FIGS. 1, 2, and 3.

The substantially flat, blunt surface provided by the top side 4 is capable of pulverizing the variety of materials. The sweep 25 can also be used to scrape or maneuver said variety of materials. Additionally, the geometry of the sweep 25 allows the user to ergonomically hold the multi-use tool 1 while using the curved blade 11 to chop or mince.

Figure 8:
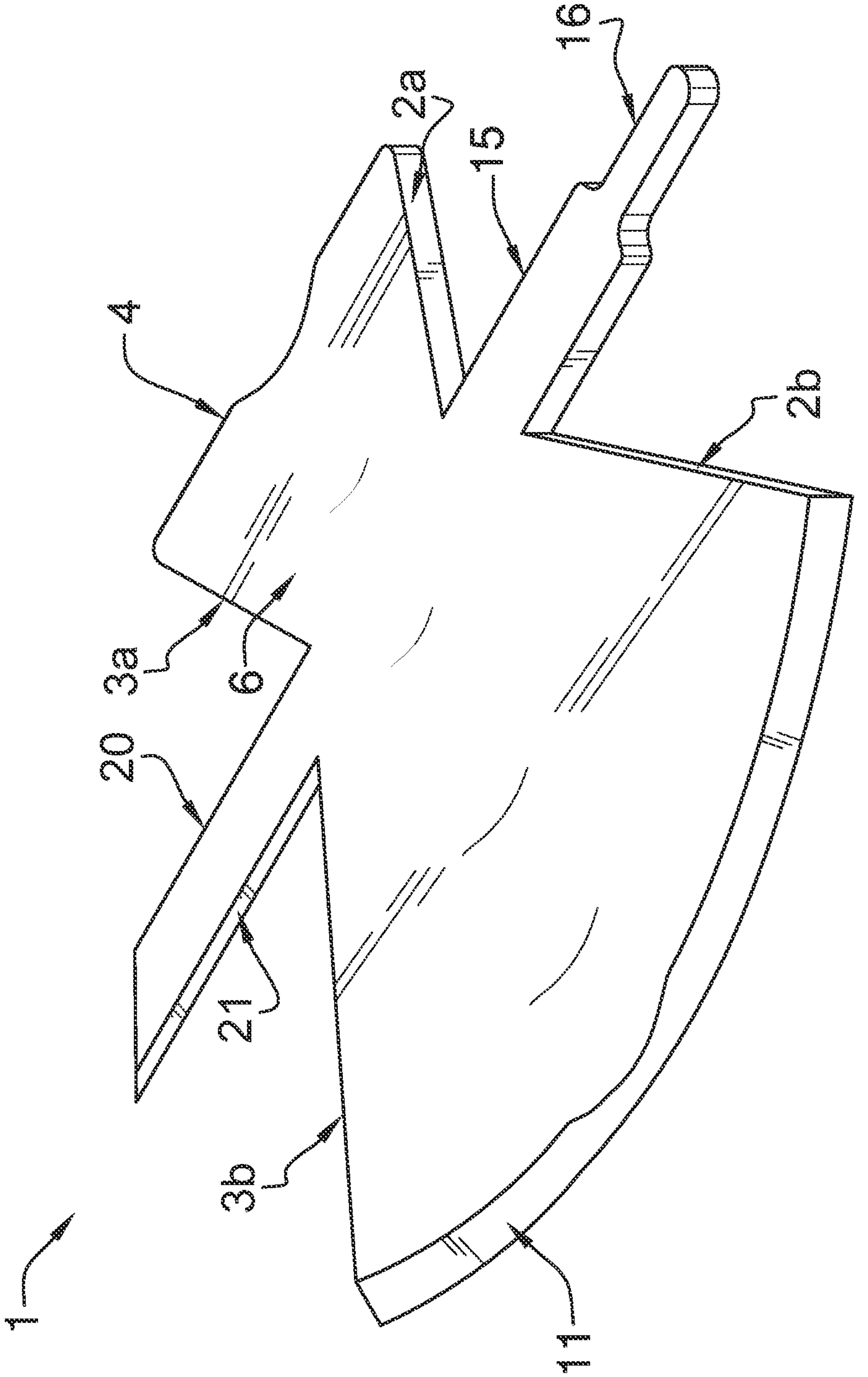
FIG. 8 is an isometric view of an alternative embodiment of the multi-use tool.
Figure 9:
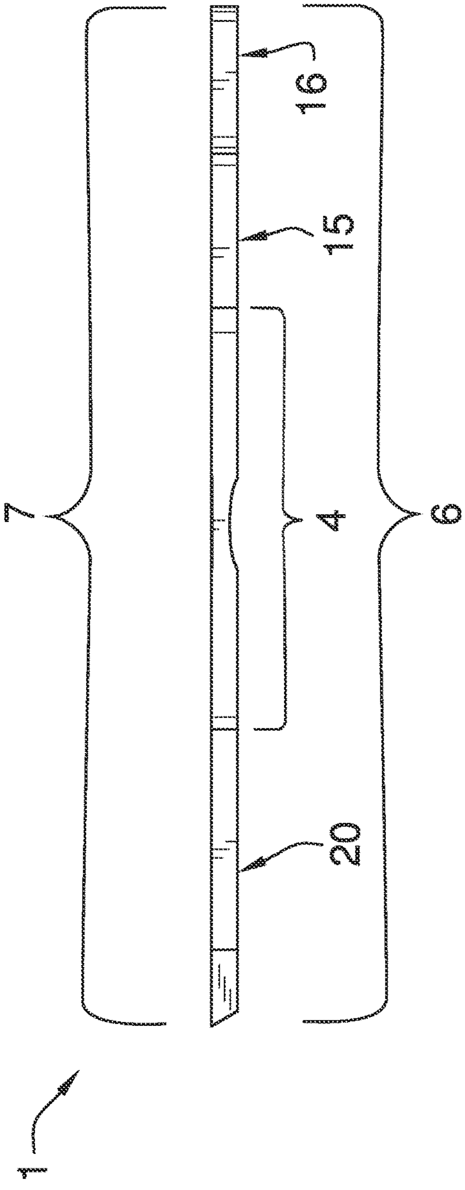
FIG. 9 is a top view of the alternative embodiment of the multi-use tool.
Figure 10:
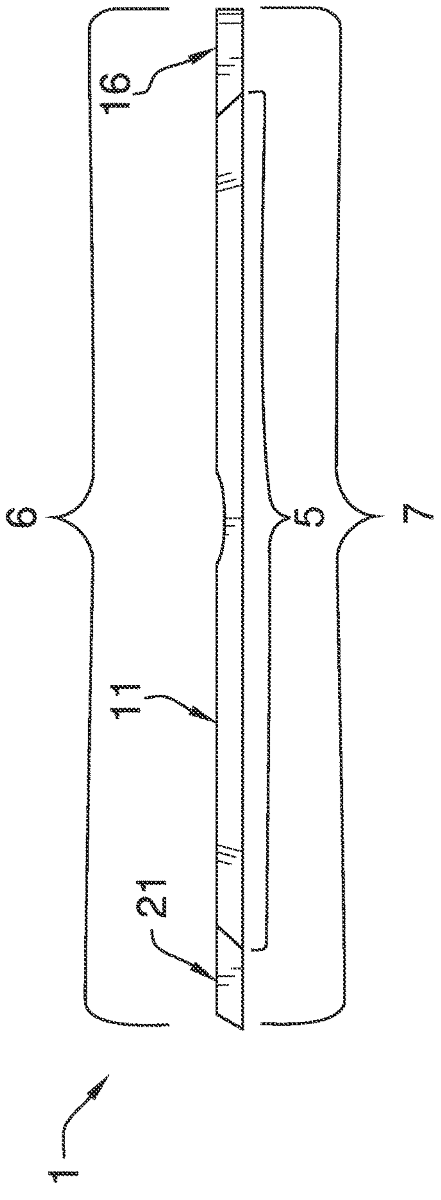
FIG. 10 is a bottom view of the alternative embodiment of the multi-use tool.

In an alternative embodiment of the multi-use tool 1, shown in FIGS. 8, 9 and 10, provides a flexible region spanning longitudinally between the top side 4 of the sweep 25 and the curved blade 11 of the skirt 10. It is anticipated that the width of the flexible region is less than the distance between the interior end of the first arm 15 and the interior end of the second arm 20. It is further anticipated that the flexible region is smoothly curved and provides a reduced thickness, relative to the thickness of the multi-use tool 1. The reduced thickness of the flexible region significantly reduces the flexural rigidity of the multi-use tool 1 about one or more axes of the flexible region. As such, the increased flexibility provided by the flexible region improves the multi-use tool's 1 ability to scoop, lift or manipulate the variety of materials. It is anticipated that the area of reduced thickness may be limited to within the sweep 25 and be utilized as a thumb or finger placement region for ergonomically griping the multi-use tool 1 during use.

While the embodiments of the invention have been disclosed, certain modifications may be made by those skilled in the art to modify the invention without departing from the spirit of the invention.

The inventor claims:

1. A multi-use tool comprising:

a. a front surface;
  wherein the front surface is substantially flat;
b. a rear surface;
  wherein the rear surface is substantially flat;
  wherein the rear surface is substantially parallel to the front surface;
c. a first side;
  wherein the first side comprises an upper first side and a lower first side;
d. a second side;
  wherein the second side comprises an upper second side and a lower second side;
e. a top side;
  wherein the top side spans from the upper first side to the upper second side;
f. a bottom side;
  wherein the bottom side spans from the lower first side to the lower second side;
g. a first arm;
  wherein the first arm has an interior end and an exterior end;
  wherein the first arm extends laterally from first side;
  wherein the interior end of the first arm is integrally attached to the first side;
  wherein the first arm provides a poker;
  wherein the poker extends from the exterior end of the first arm;
h. a second arm;
  wherein the second arm has an interior end and an exterior end;
  wherein the second arm extends laterally from second side;
  wherein the interior end of the second arm is integrally attached to the second side;
  wherein the second arm provides a blade;
i. a sweep;
  wherein the sweep has a profile;
  wherein the upper first side, top side, and upper second side comprise three sides of the sweep;
j. a skirt;
  wherein the skirt has a profile;
  wherein the lower first side, bottom side, and lower second side comprise three sides of the skirt;
  wherein the skirt provides a curved blade;
  wherein a flexible region spans longitudinally between the top side of the sweep and the bottom side of the skirt; and
  wherein the flexible region has a width being less than the distance between the interior end of the first arm and the interior end of the second arm.

2. The multi-use tool of claim 1, wherein the profile of the sweep has a trapezoidal shape.

3. The multi-use tool of claim 1, wherein the profile of the skirt has a circular sector shape.

4. The multi-use tool of claim 1, wherein the lower first side and lower second side each extend from a central vertex.

5. The multi-use tool of claim 1, wherein the multi-use tool is of unitary construction.

6. The multi-use tool of claim 1, wherein the sweep provides an area of reduced thickness.

7. The multi-use tool of claim 1, wherein the flexible region has a reduced thickness between the front surface and the rear surface relative to other regions of the multi-use tool.

8. A multi-use tool comprising:

a. a front surface;
  wherein the front surface is substantially flat;
b. a rear surface;
  wherein the rear surface is substantially flat;
  wherein the rear surface is substantially parallel to the front surface;
c. a first side;
  wherein the first side comprises an upper first side and a lower first side;
d. a second side;
  wherein the second side comprises an upper second side and a lower second side;
e. a top side;
  wherein the top side spans from the upper first side to the upper second side;
f. a bottom side;
  wherein the bottom side spans from the lower first side to the lower second side;
g. a first arm;
  wherein the first arm has an interior end and an exterior end;
  wherein the first arm extends laterally from first side;
  wherein the interior end of the first arm is integrally attached to the first side;
  wherein the first arm provides a poker;
  wherein the poker extends from the exterior end of the first arm;
h. a second arm;
  wherein the second arm has an interior end and an exterior end;
  wherein the second arm extends laterally from second side;
  wherein the interior end of the second arm is integrally attached to the second side;
  wherein the second arm provides a blade;
i. a sweep;
  wherein the sweep has a profile;
  wherein the upper first side, top side, and upper second side comprise three sides of the sweep;
j. a skirt;
  wherein the skirt has a profile;
  wherein the lower first side, bottom side, and lower second side comprise three sides of the skirt;
  wherein the skirt provides a curved blade;
  wherein a flexible region spans longitudinally between the top side of the sweep and the bottom side of the skirt;
  wherein the flexible region has a width being less than the distance between the interior end of the first arm and the interior end of the second arm; and
k. wherein the multi-use tool is of unitary construction.

9. The multi-use tool of claim 8, wherein the profile of the sweep has a trapezoidal shape.

10. The multi-use tool of claim 8, wherein the profile of the skirt has a circular sector shape.

11. The multi-use tool of claim 8, wherein the lower first side and lower second side each extend from a central vertex.

12. The multi-use tool of claim 8, wherein the sweep provides an area of reduced thickness.

13. The multi-use tool of claim 8, wherein the flexible region has a reduced thickness between the front surface and the rear surface relative to other regions of the multi-use tool.

* * * * *